United States Patent
Lee et al.

(10) Patent No.: US 11,815,761 B2
(45) Date of Patent: Nov. 14, 2023

(54) BACKLIGHT UNIT AND DISPLAY DEVICE

(71) Applicant: LG Display Co., Ltd., Seoul (KR)

(72) Inventors: Suhun Lee, Paju-si (KR); SangChul Ryu, Paju-si (KR); DongSeok Lee, Paju-si (KR); MyungJoon Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 1 day.

(21) Appl. No.: 17/855,724

(22) Filed: Jun. 30, 2022

(65) Prior Publication Data
US 2023/0020919 A1    Jan. 19, 2023

(30) Foreign Application Priority Data
Jul. 13, 2021    (KR) .......................... 10-2021-0091869

(51) Int. Cl.
G02F 1/13357    (2006.01)

(52) U.S. Cl.
CPC .. G02F 1/133603 (2013.01); G02F 1/133605 (2013.01); G02F 1/133606 (2013.01)

(58) Field of Classification Search
CPC ............... H01L 33/60; G02F 1/133603; G02F 1/133606; G02F 1/133611; G02F 1/133605
See application file for complete search history.

(56) References Cited

U.S. PATENT DOCUMENTS

| | | | |
|---|---|---|---|
| 2018/0097161 A1* | 4/2018 | Sano | H01L 25/0753 |
| 2018/0182940 A1* | 6/2018 | Yamamoto | F21V 7/0083 |
| 2020/0285114 A1* | 9/2020 | Yamashita | G02F 1/133603 |
| 2020/0379165 A1* | 12/2020 | Hayashi | H01L 33/62 |
| 2021/0270445 A1* | 9/2021 | Imada | G02B 6/0051 |
| 2021/0320087 A1* | 10/2021 | Imada | H01L 33/60 |
| 2021/0408347 A1* | 12/2021 | Tamura | H01L 33/54 |

FOREIGN PATENT DOCUMENTS

CN    211741790 U    * 10/2020    ....... G02F 1/133605

* cited by examiner

*Primary Examiner* — Erin Kryukova
(74) *Attorney, Agent, or Firm* — Fenwick & West LLP

(57) ABSTRACT

Embodiments of the present disclosure are related to a backlight unit and a display device including the same, the backlight unit that a light source unit including a light source, and a light reflector surrounding the light source, and including at least one of a light reflection pattern, a light diffusion pattern, or a light source protection layer including a color conversion material is disposed can be provided. As an exposed electrode layer on a substrate is covered by the light reflector, a light efficiency can be improved by reducing a reflection loss by the electrode layer, and by various functions that the light source unit provides, a fabrication efficiency the backlight unit can be improved and the backlight unit having a thin thickness can be provided.

18 Claims, 8 Drawing Sheets

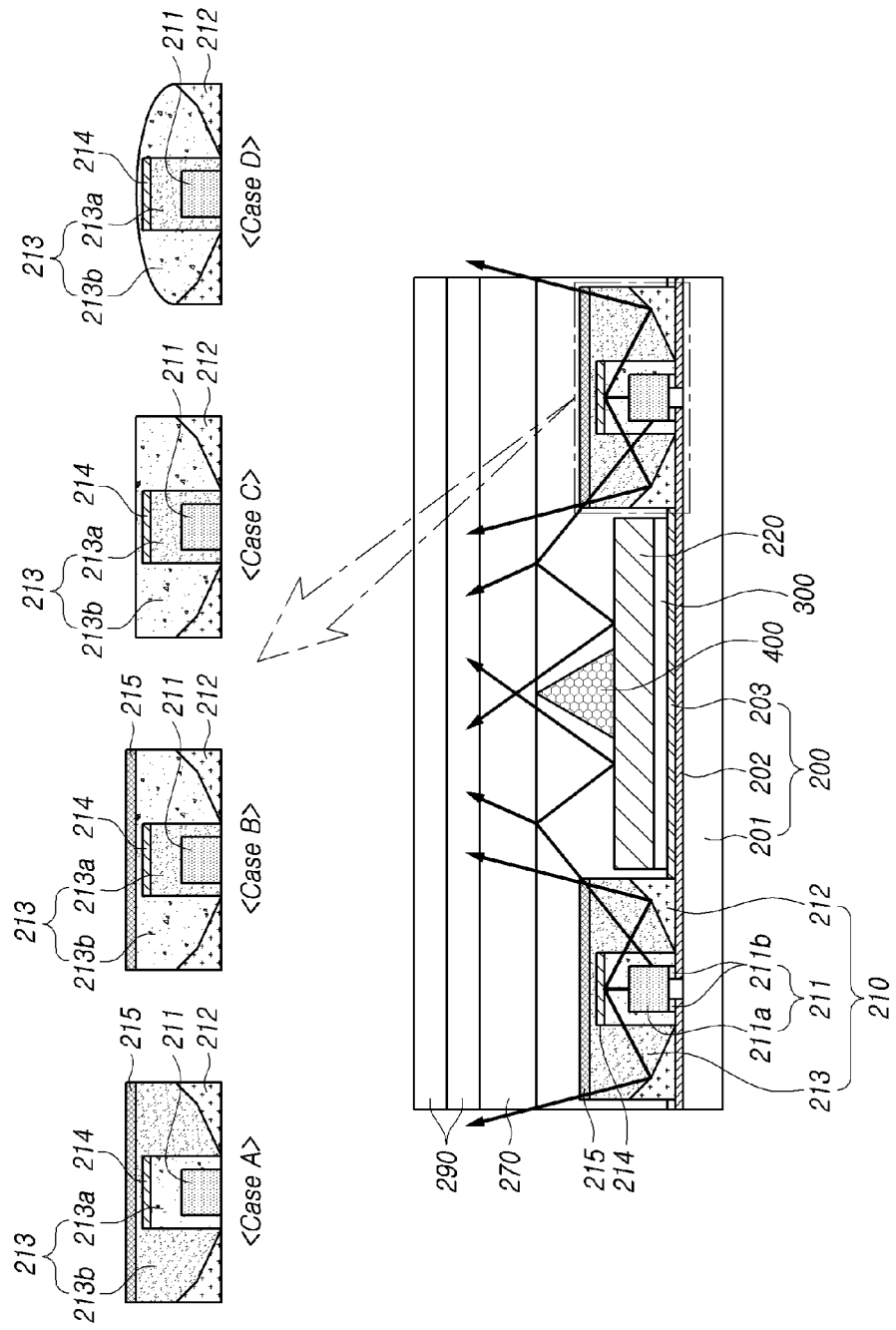

BACKLIGHT UNIT AND DISPLAY DEVICE

CROSS REFERENCE TO RELATED APPLICATION

This application claims priority from Korean Patent Application No. 10-2021-0091869, filed on Jul. 13, 2021, which is hereby incorporated by reference for all purposes as if fully set forth herein.

BACKGROUND

Field

Embodiments of the present disclosure are related to a backlight unit and a display device.

Description of Related Art

The growth of the information society leads to increased demand for display devices to display images and use of various types of display devices, such as liquid crystal display devices, organic light emitting display devices, etc.

The liquid crystal display devices can include a display panel, and a light source device such as a backlight unit supplying light to the display panel. The backlight unit can include a plurality of light sources, and various optical members.

As the liquid crystal display devices include the backlight unit, an overall thickness of the liquid crystal display devices can increase by the backlight unit.

In a case of reducing a thickness of the backlight unit for reducing a thickness of the liquid crystal display devices, an image quality of the backlight unit can be decreased due to an optical gap between the light source and the display panel that is not secured sufficiently.

SUMMARY

Embodiments of the present disclosure can provide a backlight unit being capable of reducing a loss occurred in a process that a light emitted from a light source is reflected, reducing an overall thickness of the backlight unit and improving an image quality, and a display device including the same.

Embodiments of the present disclosure can provide a backlight unit including a substrate including a base layer, an electrode layer on at least a part of the base layer and a reflection layer on at least a part of the electrode layer, and a plurality of light source units on the substrate, and each of the light source units including a light source, a light reflector surrounding the light source and a light source protection layer on the light source and the light reflector.

The light source unit can be surrounded by the reflection layer, and may not overlap each other.

Embodiments of the present disclosure can provide a backlight unit including a substrate, and a plurality of light source units on the substrate, and wherein each of the plurality of light source units includes a light source, a light reflector surrounding the light source, a light source protection layer on the light source and the light reflector, and a light reflection pattern on the light source, and the light reflection pattern covers the light source and does not overlap with the light reflector.

Embodiments of the present disclosure can provide a display device including the backlight unit above-mentioned, and a display panel being supplied a light from the backlight unit.

In still another embodiment, a backlight unit for a display device comprises a substrate comprising a base layer, an electrode layer on at least a part of the base layer, and a reflection layer on at least a part of the electrode layer; and a plurality of light source units on the substrate, each of the light source units comprising a light source, a light reflector surrounding the light source and a light source protection layer on the light source and the light reflector a light reflection pattern over the light source of each of light source units, wherein at least a part of the light reflector is positioned higher than the reflection layer and has an inclined surface angled with respect to a top surface of the reflection layer.

According to various embodiments of the present disclosure, a backlight unit being capable of reducing a reflection loss by an electrode layer exposed on an area where the reflection layer is removed, and a display device including the same can be provided.

According to various embodiments of the present disclosure, a backlight unit whose thickness is reduced and image quality is improved, and a display device including the same can be provided.

BRIEF DESCRIPTION OF THE DRAWINGS

The above and other objects, features, and advantages of the present disclosure will be more clearly understood from the following detailed description, taken in conjunction with the accompanying drawings, in which:

FIG. 8 is a cross-sectional view of another example of a backlight unit according to embodiments of the present disclosure.

DETAILED DESCRIPTION

Figure 1:
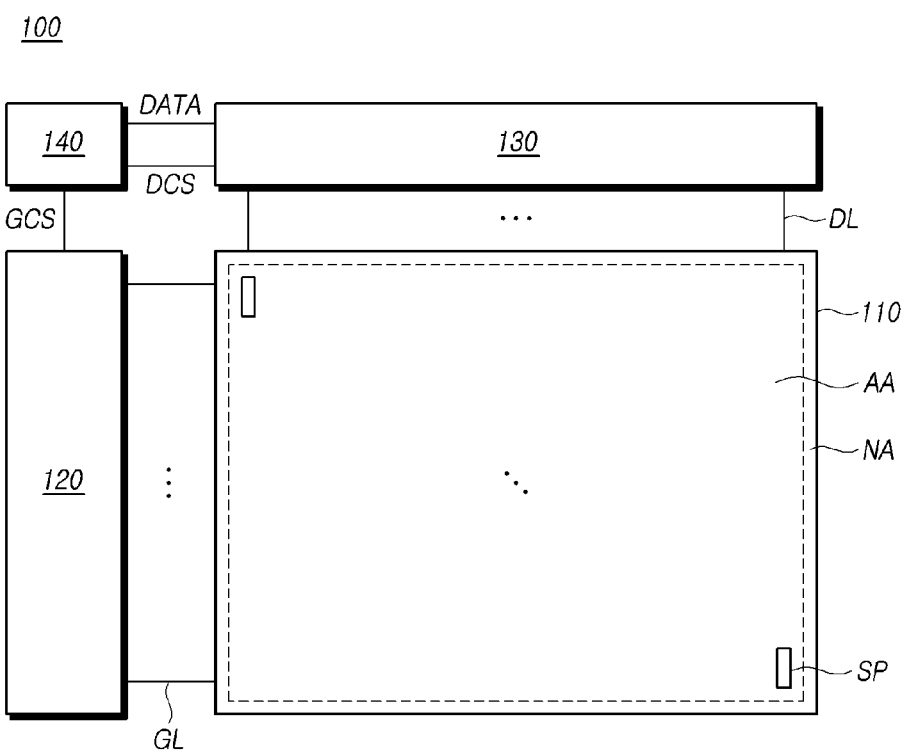
FIG. 1 is a diagram schematically illustrating a configuration included in a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

Hereinafter, various embodiments of the present disclosure will be described in detail with reference to accompanying drawings.

FIG. 1 is a diagram schematically illustrating a configuration included in a display device 100 according to embodiments of the present disclosure. All the components of the display device 100 according to all embodiments of the present disclosure are operatively coupled and configured.

Referring to FIG. 1, the display device 100 can include a display panel 110, and a gate driving circuit 120, a data driving circuit 130 and a controller 140 for driving the display panel 110.

The display panel 110 can include an active area AA where a plurality of subpixels SP are disposed, and a non-active area which is located outside the active area AA.

A plurality of gate lines GL and a plurality of data lines DL can be arranged on the display panel 110. The plurality of subpixels SP can be located in areas where the gate lines GL and the data lines DL intersect each other.

The gate driving circuit 120 is controlled by the controller 140, and sequentially outputs scan signals to the plurality of gate lines GL arranged on the display panel 110, thereby controlling the driving timing of the plurality of subpixels SP.

The gate driving circuit 120 can include one or more gate driver integrated circuits GDIC, and can be located only at one side of the display panel 110, or can be located at both sides thereof according to a driving method.

Each gate driver integrated circuit GDIC can be connected to a bonding pad of the display panel 110 by a tape automated bonding TAB method or a chip-on-glass COG method. Each gate drive integrated circuit GDIC can be implemented by a gate-in-panel GIP method to then be directly arranged on the display panel 110. In some cases, the gate driver integrated circuit GDIC can be integrated and arranged on the display panel 110. Alternatively, each gate driver integrated circuit GDIC can be implemented by a chip-on-film COF method in which an element is mounted on a film connected to the display panel 110.

The data driving circuit 130 receives image data from the controller 140 and converts the image data into an analog data voltage Vdata. Then, the data driving circuit 130 outputs the data voltage Vdata to each data line DL according to the timing at which the scan signal is applied through the gate line GL so that each of the plurality of subpixels SP emits light having brightness according to the image data.

The data driving circuit 130 can include one or more source driver integrated circuits SDIC.

Each source driver integrated circuit SDIC can include a shift register, a latch circuit, a digital-to-analog converter, an output buffer, and the like.

Each source driver integrated circuit SDIC can be connected to a bonding pad of the display panel 110 by a tape automated bonding TAB method or a chip-on-glass COG method. Each source driver integrated circuit SDIC can be directly disposed on the display panel 110. In some cases, the source driver integrated circuit SDIC can be integrated and arranged on the display panel 110. Alternatively, each source driver integrated circuit SDIC can be implemented by a chip-on-film COF method. In this case, each source driver integrated circuit SDIC can be mounted on a film connected to the display panel 110, and can be electrically connected to the display panel 110 through wires on the film.

The controller 140 supplies various control signals to the gate driving circuit 120 and the data driving circuit 130, and controls the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 can allow the gate driving circuit 120 to output a scan signal according to the timing implemented in each frame. The controller 140 can convert a data signal received from the outside to conform to the data signal format used in the data driving circuit 130 and then output the converted image data to the data driving circuit 130.

The controller 140 receives, from the outside (e.g., a host system), various timing signals including a vertical synchronization signal VSYNC, a horizontal synchronization signal HSYNC, an input data enable DE signal, a clock signal CLK, and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 can output various gate control signals GCS including a gate start pulse GSP, a gate shift clock GSC, a gate output enable signal GOE, or the like.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 can output various data control signals DCS including a source start pulse SSP, a source sampling clock SSC, a source output enable signal SOE, or the like.

The source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The display device 100 can further include a power management integrated circuit for supplying various voltages or currents to the display panel 110, the gate driving circuit 120, the data driving circuit 130, and the like or controlling various voltages or currents to be supplied thereto.

According to types of the display device 100, a liquid crystal or a light-emitting element can be disposed on the subpixel SP included in the display panel 110.

In the case that the display device 100 is a liquid crystal display device, the display device 100 can include a backlight unit supplying a light to the display panel 110.

The backlight unit can include an element emitting a light, and various optical members increasing an efficiency of the light emitted from the element.

As the various optical members are disposed on the element emitting the light, a thickness of the backlight unit can increase.

Embodiments of the present disclosure can provide methods allowing maintenance and improvement of an image quality that the backlight unit represents while reducing the thickness of the backlight unit.

Furthermore, embodiments of the present disclosure can provide methods allowing improvement of light efficiency of the backlight unit by minimizing that the light emitted from the element is lost in a process that the light is reflected.

Figure 2:
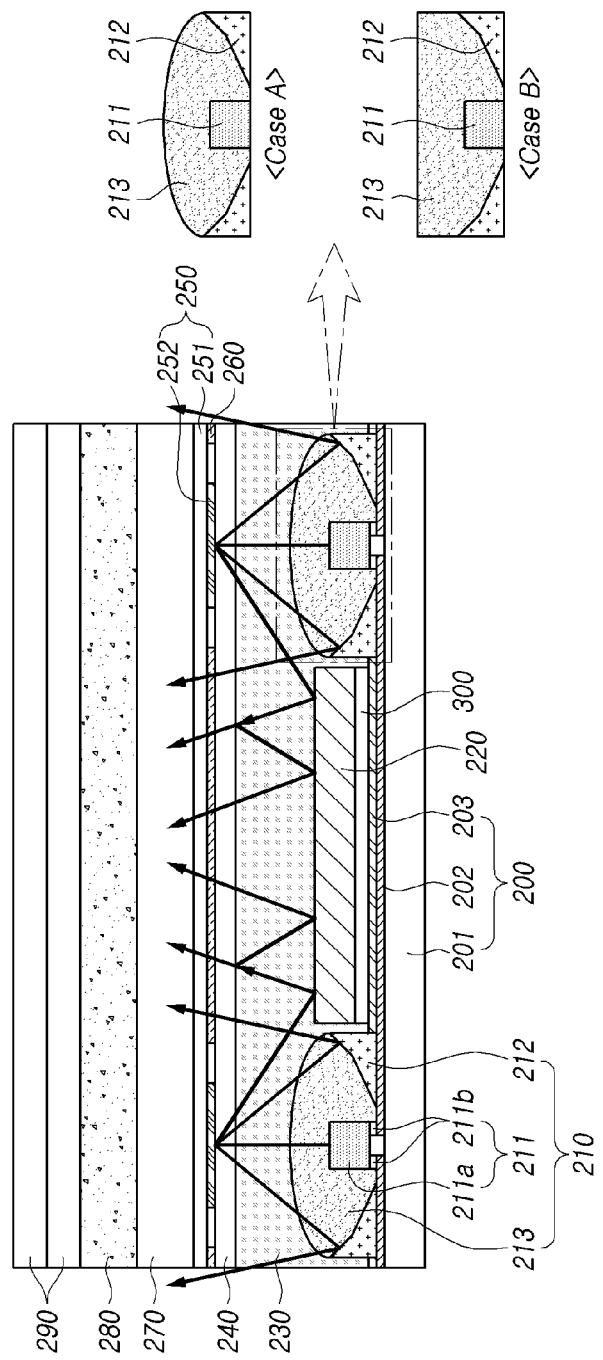
FIGS. 2 to 4 are cross-sectional views of an example of a backlight unit according to embodiments of the present disclosure.
Figure 3:
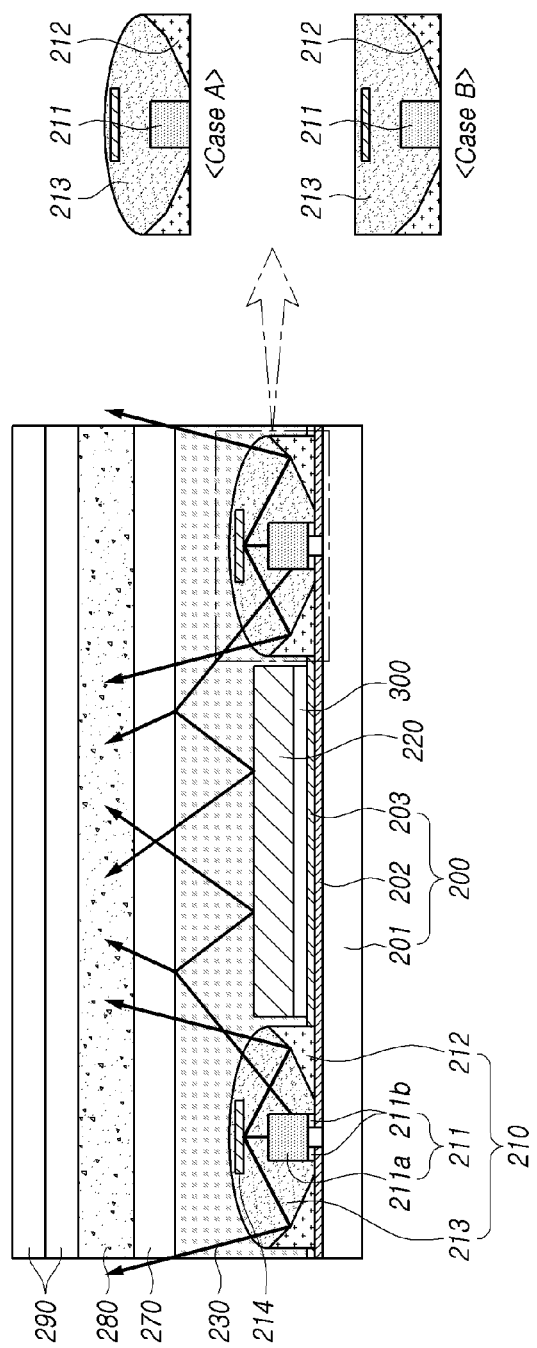
Figure 4:
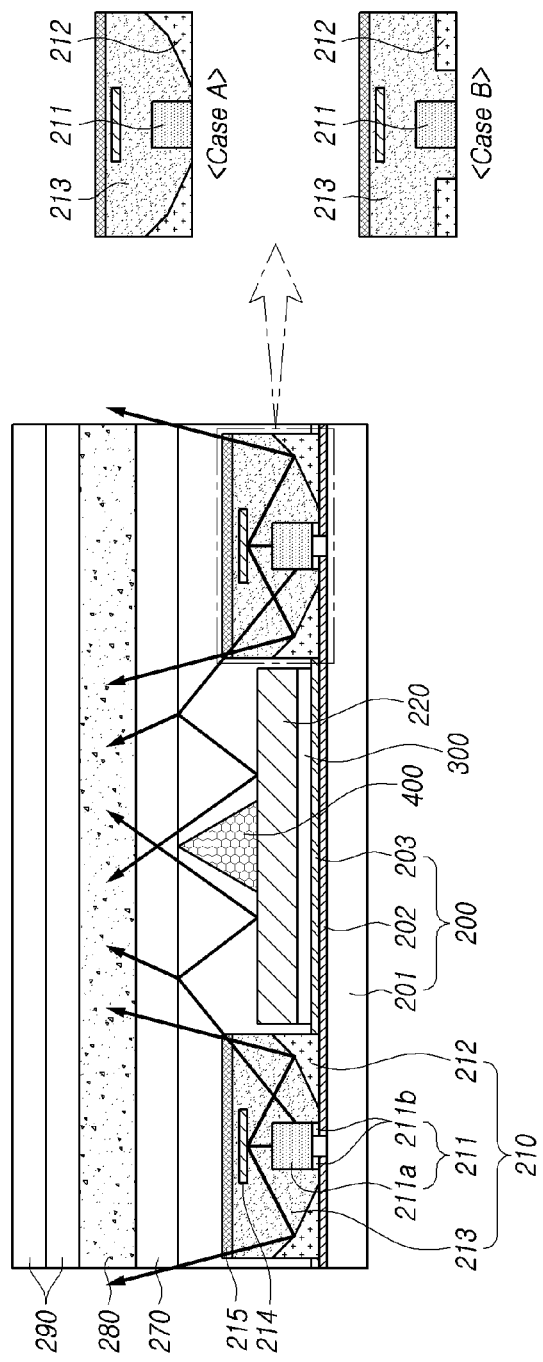
Figure 5:
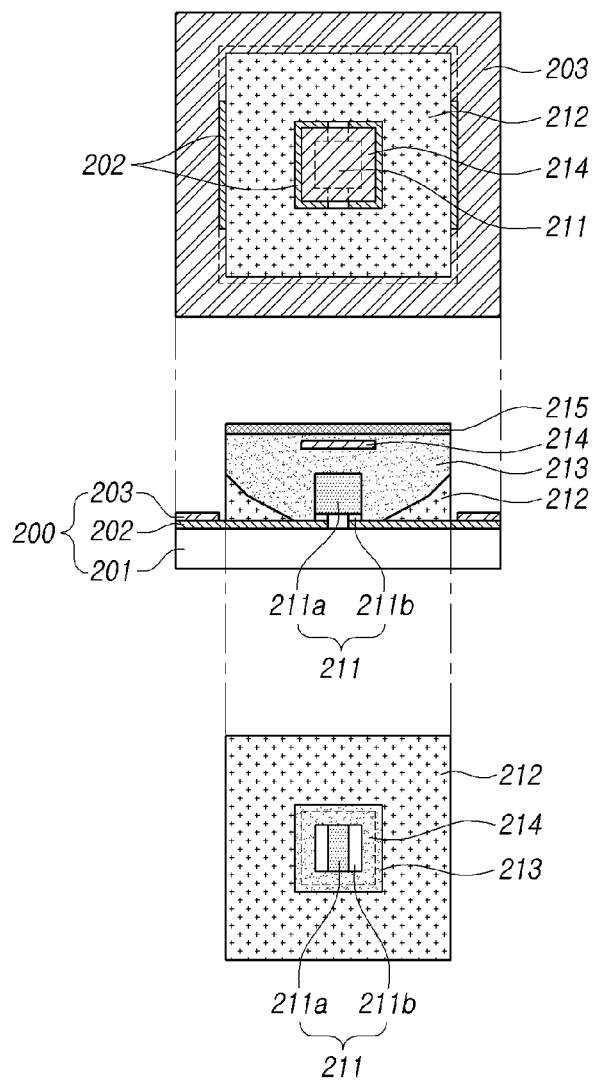
FIG. 5 is a plane view, a cross-sectional view, and a bottom view of a light source unit illustrated in FIG. 4.

FIGS. 2 to 4 are cross-sectional views of an example of a backlight unit according to embodiments of the present disclosure. FIG. 5 is a plane view, a cross-sectional view, and a bottom view of a light source unit illustrated in FIG. 4.

Referring to FIG. 2, the backlight unit can include a plurality of light source units 210 including a light source 211, and various optical members.

The plurality of light source units 210 can be disposed on a substrate 200.

The substrate 200, for example, can be a printed circuit board. The substrate 200 can be a flexible printed circuit. In some cases, the substrate 200 can be a substrate made of glass. The substrate 200 is not limited to this, and can be one of various types on which the light source unit 210 can be mounted.

The substrate 200 can include a base layer 201, an electrode layer 202 and a reflection layer 203.

The electrode layer 202 can be disposed on the base layer 201. The electrode layer 202 can be disposed on at least a part area on the base layer 201.

The electrode layer 202 can be electrically connected to the light source 211, and can perform a function of a wiring.

The reflection layer 203 can be disposed on a part area on the electrode layer 202. A portion of the reflection layer 203 disposed on the electrode layer 202 can be removed to expose the electrode layer 202. A portion of the electrode layer 202 exposed can be used for electrically connecting the light source 210.

The light source unit 210 can include the light source 211, a light reflector 212 and a light source protection layer 213.

The light source 211 can include a light-emitting portion 211a emitting a light, and an electrode portion 211b for supplying an electrical signal. The electrode portion 211b can be electrically connected to the electrode layer 202 of the substrate 200.

The light source 211, for example, can be a light-emitting diode. The light source 211 can be a mini light-emitting diode having a size of hundreds μm, or a micro light-emitting diode having a size of dozens μm.

The light reflector 212 can be disposed to surround the light source 211.

At least a portion of the light reflector 212 can be positioned on an area where the reflection layer 203 is not disposed. At least a portion of the light reflector 212 can be positioned on an area other than an area overlapping the light reflection layer 203.

The light reflector 212 can be made of a material having a reflectance greater or equal to a certain level (e.g., 90%). For example, the light reflector 212 can be made of EMC (Epoxy Molding Compound), white silicone or the like, but not limited to this.

A reflectance of the light reflector 212 can be greater than a reflectance of the electrode layer 202.

The reflection layer 203 can be removed for an electrical connection of the light source 211 and the electrode layer 202, and a portion of the electrode layer 202 can be exposed. The electrode layer 202 can be made of metal, thus the electrode layer 202 can have a lower reflectance than the reflection layer 203. A loss of light reached on the electrode layer 202 can occur.

As the light reflector 212 is disposed on an area where the reflection layer 203 is removed and the electrode layer 202 is exposed, a loss rate of a light reflected by the light reflector 212 can be reduced. As the loss rate of the light is reduced, an overall light efficiency of the backlight unit can be improved.

The light reflector 212 can have an inclined inside surface.

The inside surface of the light reflector 212 can be designed to have various angles for effective reflection of light emitted from the light source 211.

A space can be present between the light reflector 212 and the light source 211.

The light reflector 212 and the light source 211 can be positioned to be separated from each other by a certain space for effective reflection and light-guide of light emitted from the light source 211.

As the light reflector 212 is disposed on an area where the reflection layer 203 is not disposed, it can be positioned between the reflection layer 203 and the light source 211. A space or a distance between the light source 211 and the light reflector 212 can be smaller than a space or a distance between the light source 211 and the reflection layer 203.

In some cases, a portion of the reflection layer 203 can be disposed on a part area between the light reflector 212 and the electrode layer 202.

Depending on a structure that the electrode portion 211b of the light source 211 is connected to the electrode layer 202 of the substrate 200 or a processing method, some space can be present between the light source unit 210 and the electrode layer 202. The reflection layer 203 can be disposed between the light source unit 210 and the electrode layer 202, and can compensate for a height difference. In this case, an area where the reflection layer 203 is not disposed and only the electrode layer 202 is disposed can be present on a part area under the light reflector 212. As the light reflector 212 covers a portion that the electrode layer 202 is exposed, a reflection loss of light by the electrode layer 202 exposed can be reduced.

The light source protection layer 213 can be disposed on the light source 211 and the light reflector 212.

The light source protection layer 213, for example, can be made of a silicone-based resin, but not limited to this.

An outer edge of the light source protection layer 213 can overlap an outer edge of the light reflector 212.

The light source protection layer 213 can cover top surfaces of the light source 211 and the light reflector 212 and can constitute the light source unit 210.

A top surface of the light source protection layer 213 can be a convex shape such as Case A. A diffusion efficiency of a light emitted from the light source 211 can be increased by the convex shape of the top surface of the light source protection layer 213.

The top surface of the light source protection layer 213 can be a flat shape such as Case B. In some cases, in the case that an additional configuration is disposed on the top surface of the light source protection layer 213, the top surface of the light source protection layer 213 can have a flat shape.

A reflector 220 can be disposed on the substrate 200. The reflector 220 can be disposed on at least a part area of an area other than an area where the light source unit 210 is disposed on the substrate 200.

The reflector 220 can include a plurality of holes. Each of the plurality of holes can correspond to an area where the light source unit 210 is disposed. The light source unit 210 can be disposed inside the hole of the reflector 220.

The light source unit 210 can be disposed on the substrate 200, and the reflector 220 can be disposed on the substrate 200. The reflector 220, for example, can be attached on the substrate 200 by an adhesive tape 300.

An inside surface of the hole of the reflector 220 can be separated from an outside surface of the light reflector 212. A portion of the reflection layer 203 can be positioned in an area between the inside surface of the hole of the reflector 220 and the outside surface of the light reflector 212.

As space is present between the inside surface of the hole of the reflector 220 and the outside surface of the light reflector 212, the reflector 220 including the hole can be easily disposed on the substrate 200 where the light source unit 210 is disposed. As the reflection layer 203 is positioned in an area between the inside surface of the hole of the reflector 220 and the outside surface of the light reflector 212, the electrode layer 202 may not be exposed and increase in loss ratio may be prevented in a process that the light is reflected or guided.

A light-guide portion 230 can be disposed on the light source unit 210 and the reflector 220.

The light-guide portion 230 can secure a space such that light emitted from the light source 211 can be light-guided sufficiently.

The light-guide portion 230, for example, can be made of a silicone-based resin. The light-guide portion 230 can be made of a same material as the light source protection layer 213.

A refractive index of the light-guide portion 230 can be identical to a refractive index of the light source protection layer 213.

Alternatively, a refractive index of a material constituting the light-guide portion 230 can be smaller than a refractive index of a material constituting the light source protection layer 213. As the refractive index of the material constituting the light source protection layer 213 is greater or equal to the refractive index of the material constituting the light-guide portion 230, diffusion efficiency of light emitted from the light source 211 can be increased.

A protective film 240 can be disposed on the light-guide portion 230. The protective film 240 can be a transparent film, for example, made of PET. In some cases, the protective film 240 may not be disposed on the light-guide portion 230.

A light control film 250 can be disposed on the protective film 240.

The light control film 250 can include a base film 251 and a plurality of light control patterns 252 disposed on at least one surface of a top surface or a bottom surface of the base film 251.

The base film 251 can be transparent film, for example, made of PET.

Each of the plurality of light control patterns 252 can be positioned to correspond to the light source unit 210.

As the light control pattern 252 is positioned to correspond to the light source unit 210, the light control pattern 252 can be positioned in an area where intensity of light emitted from the light source 211 is the strongest.

The light control pattern 252 can be made of a material having a high reflectance, for example, can be made of TiO2.

Almost all of the light reaching the light control pattern 252 can be reflected. At least some of the light reaching the light control pattern 252 can transmit the light control pattern 252.

Light reaching the light control pattern 252 can be reflected and can be light-guided by the light-guide portion 230 and can be reflected by the reflector 220. Light can be supplied uniformly on an area where an amount of a light is small due to the light source 211 not being disposed.

The light control film 250 can be disposed on the protective film 240 by an adhesive layer 260 disposed on an area where the light control pattern 252 is not positioned. An air layer can be present between the base film 251 and the protective film 240 where the adhesive layer 260 and the light control pattern 252 are not positioned.

A diffusion plate 270, a color conversion sheet 280 and an optical sheet 290 can be disposed on the light control film 250.

As the exposed area of the electrode layer 202 of the substrate 200 by the light reflector 212 included in the light source unit 210 is minimized, loss of light in a process that the light is reflected and light-guided can be reduced.

Furthermore, as an amount of light supplied to an area between the light source units 210 increases by the light control pattern 252 disposed on the light source unit 210, uniformity of a light according to an area of the backlight unit can be improved.

Furthermore, embodiments of the present disclosure can provide the backlight unit having a structure where the light source unit 210 includes a configuration spreading light emitted from the light source 211.

Referring to FIG. 3, the plurality of light source units 210 can be disposed on the substrate 200.

The reflector 220 can be disposed on at least a part area of an area where the light source unit 210 is not disposed. The light-guide portion 230 can be disposed on the light source 210 and the reflector 220.

Each of the plurality of light source units 210 can include the light source 211, the light reflector 212 surrounding the light source 211 and the light source protection layer 213 disposed on the light source 211 and the light reflector 212.

Each of the plurality of light source units 210 can include a light reflection pattern 214 positioned on the light source 211.

The light reflection pattern 214 can be disposed in an area including an area overlapping the light source 211. The light reflection pattern 214 can be positioned between a top surface of the light source 211 and a top surface of the light source protection layer 213. The light reflection pattern 214 can be disposed not to overlap the light reflector 212.

A top surface of the light source protection layer 213 can be a convex shape such as Case A, or can be a flat shape such as Case B.

The light reflection pattern 214 can be opaque. Alternatively, the light reflection pattern 214 can have very low transmittance.

The light reflection pattern 214 can have a reflectance greater or equal to a certain level (e.g., 90%). The light reflection pattern 214, for example, can be made by mixing silicone and TiO2. A ratio of silicone and TiO2 can be different depending on the reflectance of the light reflection pattern 214.

As the light reflection pattern 214 is positioned on the light source 211, a light emitted from the light source 211 can be reflected by the light reflection pattern 214.

A vertical distance between the light reflection pattern 214 and the light source 211 can be vary according to a structure of the backlight unit.

A light reflected by the light reflection pattern 214 can be reflected by the light reflector 212 and can be transferred to an upper area of the light source unit 210.

Furthermore, some of the light emitted from the light source 211 can be reflected by the reflector 220 and can be output on the light-guide portion 230. Some of the light can be totally reflected on a top surface of the light-guide portion 230, and can be light-guided inside the light-guide portion 230 and can be reflected by the reflector 220 to be output on the light-guide portion 230.

As the light reflection pattern 214 is disposed inside the light source unit 210, the light control film 250 may not be disposed on the light-guide portion 230.

The diffusion plate 270, the color conversion sheet 280 and the optical sheet 290 can be disposed on the light-guide portion 230.

As the light control film 250 is not disposed, a thickness of the backlight unit can be reduced.

As the light reflection pattern 214 is positioned inside the light source unit 210, an alignment between the light source 211 and the light reflection pattern 214 can be achieved easily.

Thus, the thickness of the backlight unit can be reduced, the process can be made to be easy, and a uniformity of a light according to an area of the backlight unit can be improved.

Furthermore, according to embodiments of the present disclosure, as the light source unit 210 includes a structure spreading a light output to outside of the light source unit 210, a light efficiency by the light source unit 210 can be improved more.

Referring to FIG. 4, the plurality of light source units 210 and the reflector 220 can be disposed on the substrate 200.

Each of the plurality of light source units 210 can include the light source 211, the light reflector 212, the light source protection layer 213, the light reflection pattern 214 and the light diffusion pattern 215.

The light diffusion pattern 215 can be disposed on a top surface of the light source protection layer 213.

The light diffusion pattern 215 can be a transparent layer. The light diffusion pattern 215 can include a light diffusive material. The light diffusion pattern 215, for example, can be made by adding a light diffusive function powder such as TiO2, Al2O3, silica to silicone.

The light diffusion pattern 215 can prevent damage of the light reflection pattern 214. The light diffusion pattern 215 can be positioned in an upper portion of the light source unit 210, and can increase diffusion efficiency of light emitted from the light source 211.

The light diffusion pattern 215 can be disposed on a top surface of the light source protection layer 213 and can be positioned to be separated from the light reflection pattern 214. In this case, a portion of the light source protection layer 213 can be positioned between the light reflection pattern 214 and the light diffusion pattern 215.

The light diffusion pattern 215, in some cases, can be disposed to contact the light reflection pattern 214.

As the light diffusion pattern 215 is disposed, a top surface of the light source protection layer 213 can be a flat shape. In some cases, the top surface of the light source protection layer 213 can be a convex shape, and the light diffusion pattern 215 can be disposed along the convex top surface of the light source protection layer 213.

The light reflector 212 can have an inclined inside surface such as Case A.

As a light diffusion efficiency is improved in an upper portion of the light source unit 210 by the light diffusion pattern 215, the light reflector 212 can have a flat top surface similarly to the reflector 220 such as Case B. A structure of the light reflector 212 according to Case B can be applied to an example above-mentioned through FIG. 2 and FIG. 3.

The light-guide portion 230 can be disposed on the light source unit 210 and the reflector 220, but the light-guide portion 230 may not be disposed on the light source unit 210 and the reflector 220 such as an example illustrated in FIG. 4.

In this case, a diffusion plate supporter 400 can be disposed on the reflector 220.

The diffusion plate 270 can be supported by the diffusion plate supporter 400. The color conversion sheet 280 and the optical sheet 290 or the like can be disposed on the diffusion plate 270.

As the diffusion plate supporter 400 supports the diffusion plate 270, an air layer can be present between the light source unit 210 and the diffusion plate 270. A diffusion performance of light emitted to outside of the light source unit 210 can be improved due to a difference between a refractive index of the light source protection layer 213 and a refractive index of the air layer.

The light diffusion performance can be improved by the light diffusion pattern 215 positioned in an upper portion of the light source unit 210 and the air layer positioned on the light diffusion pattern 215, and light efficiency of the backlight unit can be improved.

Referring to FIG. 5, it illustrates a plane view, a cross-sectional view and a bottom view of the light source unit 210 illustrated in FIG. 4.

For convenience of description, the plane view of the light source unit 210 illustrates a structure that the light source protection layer 213 and the light diffusion pattern 215 are omitted. For convenience of description, the bottom view of the light source unit 210 illustrates a structure that the substrate 200 is omitted.

The light source unit 210 can be disposed on the substrate 200 including the base layer 201, the electrode layer 202 and the reflection layer 203.

The light source unit 210 can be disposed on an area where the electrode layer 202 is exposed as the reflection layer 203 is removed. The light reflector 212 included in the light source unit 210 can overlap an exposed portion of the electrode layer 202.

Such as an example illustrated in the plane view of the light source unit 210, the exposed portion of the electrode layer 202 can be minimized Thus, increase of a loss ratio of a light emitted from the light source 211 by the electrode layer 202 can be prevented.

The light reflector 212 can be positioned to be separated from the light source 211.

As space between the light reflector 212 and the light source 211 is present, the exposed portion of the electrode layer 202 can be positioned between the light reflector 212 and the light source 211.

Such as an example illustrated in the bottom view of the light source unit 210, as the electrode portion 211b of the light source 211 and the light reflector 212 are separated from each other, an electrical connection of the electrode portion 211b and the electrode layer 202 can be performed easily.

Since an arrangement of the light source 211 on the substrate 200 can be performed easily, a structure capable of minimizing a reflection loss by the electrode layer 202 can be provided.

Furthermore, by the light reflection pattern 214 and the light diffusion pattern 215 positioned in an upper portion of the light source unit 210, a thickness of the backlight unit can be reduced and a structure can be simplified, and light uniformity and light efficiency of the backlight unit can be improved.

Figure 6:
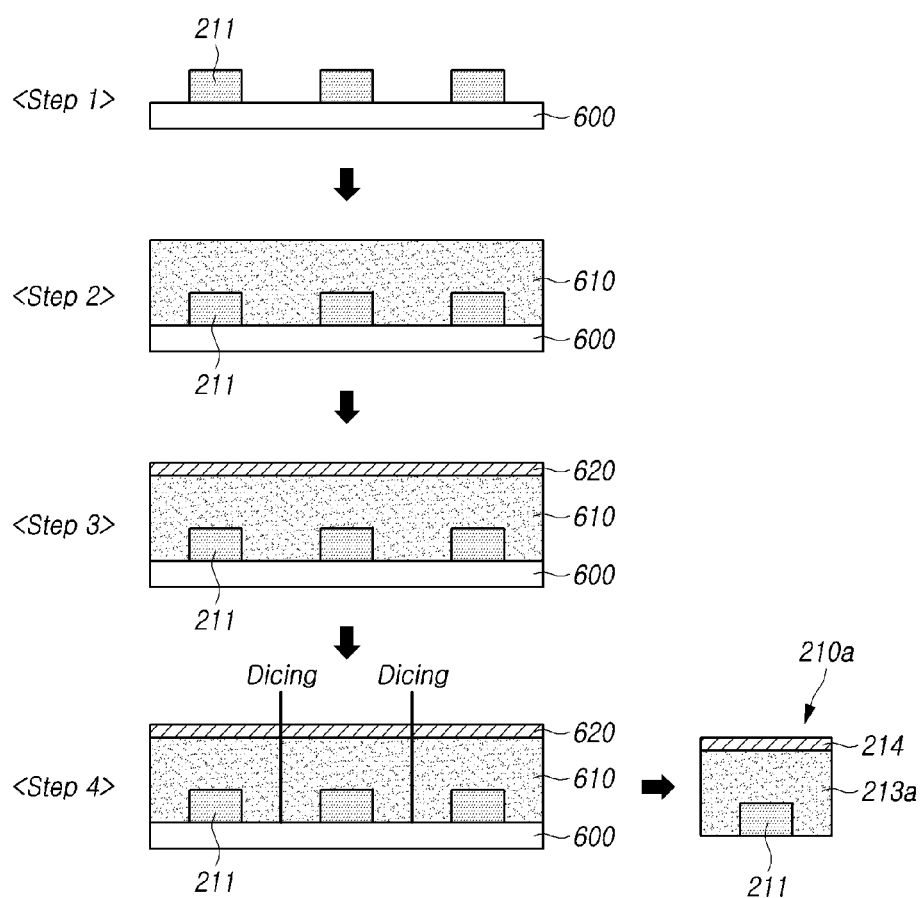
FIGS. 6 and 7 are diagrams illustrating an example of a method of fabricating a light source unit illustrated in FIG. 4.
Figure 7:
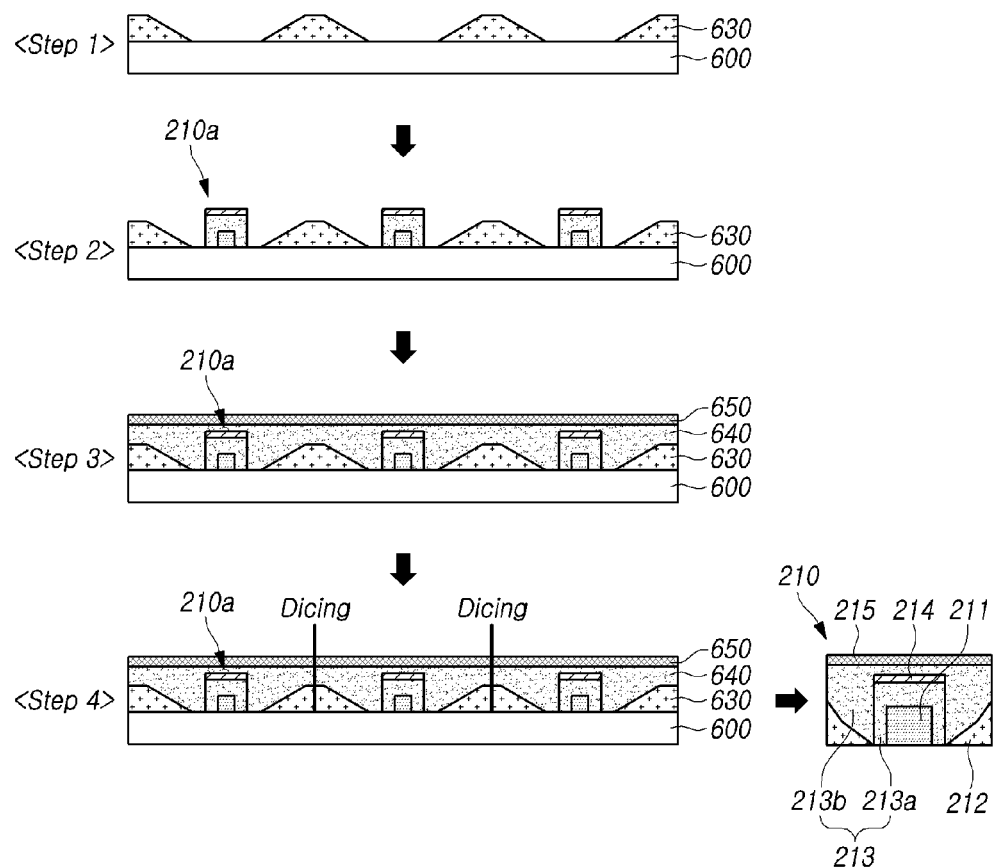

FIGS. 6 and 7 are diagrams illustrating an example of a method of fabricating the light source unit 210 illustrated in FIG. 4.

Referring to FIGS. 6 and 7, a process fabricating the light source unit 210, for example, can be performed as a first process (an example of FIG. 6) and a second process (an example of FIG. 7).

Referring to FIG. 6, the light source 211 can be disposed on a film for fabricating light source unit 600 (Step 1).

A first material 610 can be disposed on the light source 211 (Step 2).

The first material 610 can be a material disposed for constituting a portion of the light source protection layer 213 included in the light source unit 210. The first material 610, for example, can be made of silicone-based resin.

A second material 620 can be disposed on the first material (Step 3).

The second material 620 can be a material disposed for constituting the light reflection pattern 214 included in the light source unit 210. The second material 620, for example, can be made by mixing silicone and TiO2.

After the second material 620 is disposed, a dicing can be performed for each light source 211 (Step 4).

A first portion 210a of the light source unit 210 including the light source 211, a first portion 213a of the light source protection layer 213 surrounding the light source 211 and the light reflection pattern 214 disposed on the first portion 213a of the light source protection layer 213 can be fabricated.

The first portion 210a of the light source unit 210, for example, can be a hexahedral shape, but not limited to this.

As the dicing is performed in a state that the second material 620 is disposed on the first material 610, the light reflection pattern 214 can overlap the first portion 213a of the light source protection layer 213.

After fabricating the first portion 210a of the light source unit 210, a subsequent process can be performed.

Referring to FIG. 7, a third material 630 can be disposed on the film for fabricating light source unit 600 (Step 1).

The third material 630 can be a material disposed for constituting the light reflector 212 included in the light source unit 210. The third material 630 can be a material having a reflectance greater or equal to a certain level such as EMC, white silicone or the like.

The first portion 210a of the light source unit 210 fabricated in advance can be disposed on an area where the third material 630 is not disposed on the film for fabricating light source unit 600 (Step 2).

As the first portion 210a of the light source unit 210 is disposed in an area where the third material 630 is not disposed, the light reflection pattern 214 can be positioned on an area not overlapping the light reflector 212 made of the third material 630.

After the first portion 210a of the light source unit 210 is disposed, a fourth material 640 and a fifth material 650 can be disposed subsequently (Step 3).

The fourth material 640 can be a material disposed for constituting a rest portion of the light source protection layer 213 included in the light source unit 210.

The fourth material 640 can be a same material as the first material 610 constituting the first portion 213a of the light source protection layer 213. Alternatively, the fourth material 640 can be a material having a refractive index lower than a refractive index of the first material 610.

Furthermore, in some cases, the fourth material 640 can be a mixture including material different from the first material 610.

The fourth material 640 can be disposed to cover the first portion 210a of the light source unit 210. Alternatively, in some cases, the fourth material 640 can be disposed in only an area where the first portion 210a of the light source unit 210 is not disposed. In this case, a top surface of the fourth material 640 can be positioned on a same plane as a top surface of the light reflection pattern 214.

The fifth material 650 can be a material disposed for constituting the light diffusion pattern 215 included in the light source unit 210. The fifth material 650, for example, can be a material where TiO2, $Al_2O_3$, silica or the like is added to silicone.

After the fourth material 640 and the fifth material 650 are disposed, dicing can be performed (Step 4).

The light source unit 210 including the light source 211, the light reflector 212, the first portion 213a and the second portion 213b of the light source protection layer 213, the light reflection pattern 214 and the light diffusion pattern 215 can be fabricated.

As the dicing is performed in a state that the fifth material 650 is disposed on the third material 630 and the fourth material 640, an outer edge of the light diffusion pattern 215 can overlap an outer edge of the light reflector 212. The outer edge of the light diffusion pattern 215 can overlap an outer edge of the second portion 213b of the light source protection layer 213.

By arranging fabricated light source unit 210 on the substrate 200 and arranging the reflector 220 and various optical members, the backlight unit can be fabricated.

By arranging the light reflector 212 on a periphery of the light source 211 and the light reflection pattern 214 and the light diffusion pattern 215 on the light source 211, a light efficiency of the light source unit 210 can be improved and ease of processing can be improved.

Furthermore, as the first portion 213a and the second portion 213b of the light source protection layer 213 are disposed by separate processes, the light source unit 210 can be constituted variously by differentiating materials of the first portion 213a and the second portion 213b.

For example, by differentiating a refractive index of the first portion 213a of the light source protection layer 213 and a refractive index of the second portion 213b, a diffusion performance of light emitting from the light source 211 can be improved.

Alternatively, according to embodiments of the present disclosure, by disposing a color conversion material in at least one of the first portion 213a or the second portion 213b of the light source protection layer 213, the light source unit 210 supplying white light can be implemented.

FIG. 8 is a cross-sectional view of another example of the backlight unit according to embodiments of the present disclosure.

Referring to FIG. 8, the light source unit 210 and the reflector 220 can be disposed on the substrate 200. The diffusion plate supporter 400 can be disposed on the reflector 220. Alternatively, the light-guide portion 230 can be disposed on the light source unit 210 and the reflector 220 such as an example above-mentioned.

The light source unit 210 can include the light source 211, the light reflector 212 and the light source protection layer 213. The light source unit 210 can include the light reflection pattern 214 and the light diffusive pattern 215 positioned on the light source 211.

The light source protection layer 213 can include the first portion 213a enclosing the light source 211 and positioned in an area overlapping the light reflection pattern 214. The light source protection layer 213 can include the second portion 213b enclosing the first portion 213a of the light source protection layer 213 and the light reflection pattern 214 and positioned in an area overlapping the light diffusion pattern 215.

At least one of the first portion 213a or the second portion 213b of the light source protection layer 213 can include a color conversion material.

For example, such as Case A, the first portion 213a of the light source protection layer 213 can include the color conversion material.

Alternatively, such as Case B, the second portion 213b of the light source protection layer 213 can include the color conversion material. In some cases, the first portion 213a and the second portion 213b of the light source protection layer 213 can include the color conversion material.

As the second portion 213b of the light source protection layer 213 includes the color conversion material, some of the color conversion material can be positioned between the light reflection pattern 214 and the light diffusion pattern 215. In some cases, in the case that the light reflection pattern 214 and the light diffusion pattern 215 are contacted, the color conversion material can be positioned on a peripheral area of the first portion 213a of the light source protection layer 213.

As the color conversion material is included in the first portion 213a or the second portion 213b of the light source protection layer 213, a wavelength of at least some of the light emitted from the light source 211 can be converted and the light can be output to outside of the light source unit 210. White light can be supplied by the light source unit 210.

In the case that the second portion 213b of the light source protection layer 213 includes the color conversion material, a light diffusion function can be provided by the color conversion material.

In this case, such as Case C, the light diffusion pattern 215 may not be disposed on the second portion 213b of the light source protection layer 213. In an example of the second process illustrated in FIG. 7, a process that the fifth material 650 for constituting the light diffusion pattern 215 is disposed can be omitted.

Furthermore, a top surface of the second portion 213b of the light source protection layer 213 can be a flat shape such as Case A, Case B, Case C, but in some cases, can be a convex shape such as Case D.

As a portion of the light source protection layer 213 of the light source unit 210 includes the color conversion material, the color conversion sheet 280 may not be disposed in the backlight unit.

The process can be easier by the light source unit 210 including the color conversion material and a thickness of the backlight unit can be reduced more, and the backlight unit that a light efficiency is improved can be provided.

The embodiments of the present disclosure described above will be briefly described as follows.

A backlight unit according to embodiments of the present disclosure can include a substrate 200 including a base layer 201, an electrode layer 202 disposed on at least a part area on the base layer 201 and a reflection layer 203 disposed on a part area on the electrode layer 202, and a plurality of light source units 210 disposed on the substrate 200 and including a light source 211, a light reflector 212 surrounding the light source 211 and a light source protection layer 213 disposed on the light source 211 and the light reflector 212.

At least a portion of the light reflector 212 included in each of the plurality of light source units 210 can be positioned in an area other than an area overlapping the reflection layer 203.

A space or a distance between the light source 211 and the reflection layer 203 can be greater than a space or a distance between the light source 211 and the light reflector 212. The light reflector 212 can be positioned between an area where the reflection layer 203 is disposed and an area where the light source 211 is disposed.

Alternatively, a portion of the reflection layer 203 can be positioned in a part of an area between the light reflector 212 and the electrode layer 202.

Each of the plurality of light source units 210 can further include a light reflection pattern 214 positioned on the light source 211, disposed in an area including an area overlapping the light source 211, and disposed in an area other than an area overlapping the light reflector 212.

The light reflection pattern 214 can be positioned between a top surface of the light source 211 and a top surface of the light source protection layer 213.

Each of the plurality of light source units 210 can further include a light diffusion pattern 215 disposed on a top surface of the light source protection layer 213 and disposed in an area including an area overlapping the light source 211 and the light reflector 212.

An outer edge of the light diffusion pattern 215 can overlap an outer edge of the light reflector 212.

A portion of the light source protection layer 213 can be positioned between the light reflection pattern 214 and the light diffusion pattern 215.

The light source protection layer 213 can include a first portion 213a disposed under the light reflection pattern 214 and disposed in an area overlapping the light reflection pattern 214, and a second portion 213b disposed to enclose the light reflection pattern 214 and the first portion 213a and having an outer edge overlapping an outer edge of the light reflector 212.

A refractive index of the first portion 213a of the light source protection layer 213 can be greater or equal to a refractive index of the second portion 213b of the light source protection layer 213.

One of the first portion 213a of the light source protection layer 213 and the second portion 213b of the light source protection layer 213 can include a color conversion material.

Some of the color conversion material can be positioned between the light reflection pattern 214 and a top surface of the light source protection layer 213.

The backlight unit can further include a reflector 220 disposed on the substrate 200 and including a plurality of holes positioned on an area corresponding to each of the plurality of light source units 210 and wherein an inside surface of each of the plurality of holes is spaced apart from an outside surface of the light reflector 212.

A portion of the reflection layer 203 can be positioned in an area between the inside surface of each of the plurality of holes and the outside surface of the light reflector 212.

A top surface of the reflector 220 can be flat, and the inside surface of the light reflector 212 can be inclined.

A backlight unit according to embodiments of the present disclosure can include a substrate 200, and a plurality of light source units 210 disposed on the substrate 200, and wherein each of the plurality of light source units 210 includes a light source 211, a light reflector 212 surrounding the light source 211, a light source protection layer 213 disposed on the light source 211 and the light reflector 212, and a light reflection pattern 214 positioned on the light source 211, disposed in an area including an area overlapping the light source 211, and disposed om an area other than an area overlapping the light reflector 212.

According to embodiments of the present disclosure above-mentioned, a backlight unit where a process easiness is improved can be provided by the light source unit 210 including the light source 211 and the light reflector 212 surrounding the light source 211, and further including at least one of the light reflection pattern 214, the light diffusion pattern 215, or the light source protection layer 213 including the color conversion material.

As the light reflector 212 covers a part of a portion where the electrode layer 202 of the substrate 200 is exposed, a reflection loss by the portion where the electrode layer 202 is exposed can be reduced and the light efficiency of the backlight unit can be improved.

As the light reflection pattern 214, the light diffusion pattern 215 and the light source protection layer 213 including the color conversion material are included in the light source unit 210, various optical members disposed on the light source 211 can be reduced. Thus, a fabrication error can be reduced, and a thinner backlight unit can be provided.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device, comprising:
   a display panel; and
   a backlight unit configured to supply a light to the display panel,
   wherein the backlight unit comprises:
   a substrate comprising a base layer, an electrode layer on at least a part of the base layer and a reflection layer on at least a part of the electrode layer; and
   a plurality of light source units on the substrate, each of the light source units comprising a light source, a light reflector surrounding the light source and a light source protection layer on the light source and the light reflector, and
   wherein the light source unit is surrounded by the reflection layer, and does not overlap each other,
   wherein each of the plurality of light source units further comprises a light reflection pattern on the light source, and the light reflection pattern covers the light source and does not overlap with the light reflector,
   wherein the light reflection pattern is disposed between a top surface of the light source and a top surface of the light source protection layer.

2. The display device of claim 1, wherein a distance between the light source and the reflection layer is greater than a distance between the light source and the light reflector.

3. The display device of claim 1, wherein the light reflector is disposed between the reflection layer and the light source.

4. The display device of claim 1, wherein each of the plurality of light source units further comprises a light diffusion pattern on the light source protection layer; and
   the light diffusion pattern overlaps with at least a part of the light source and the light reflector.

5. The display device of claim 4, wherein an outer edge of the light diffusion pattern is flush with an outer edge of the light reflector.

6. The display device of claim 4, wherein a part of the light source protection layer is disposed between the light reflection pattern and the light diffusion pattern.

7. The display device of claim 4, wherein the light source protection layer comprises:
   a first portion disposed under the light reflection pattern, and disposed in an area overlapping the light reflection pattern; and
   a second portion disposed to enclose the light reflection pattern and the first portion, and having an outer edge flush with an outer edge of the light reflector.

8. The display device of claim 7, wherein a refractive index of the first portion of the light source protection layer is greater or equal to a refractive index of the second portion of the light source protection layer.

9. The display device of claim 7, wherein one of the first portion of the light source protection layer and the second portion of the light source protection layer comprises a color conversion material.

10. The display device of claim 9, wherein the color conversion material is positioned between the light reflection pattern and a top surface of the light source protection layer.

11. The display device of claim 1, wherein the backlight unit further comprises a reflector on at least a part of the reflection layer and including a plurality of holes positioned in an area corresponding to each of the plurality of light source units, and
    wherein an inside surface of each of the plurality of holes is spaced apart from an outside surface of the light reflector of each of the light source units.

12. The display device of claim 11, wherein a part of the reflection layer is disposed in an area between the inside surface of each of the plurality of holes and the outside surface of the light reflector.

13. The display device of claim 11, wherein a top surface of the reflector is flat, and the inside surface of the light reflector is inclined.

14. A backlight unit, comprising:
a substrate; and
a plurality of light source units on the substrate, and
wherein each of the plurality of light source units comprises:
a light source;
a light reflector surrounding the light source;
a light source protection layer on the light source and the light reflector; and
a light reflection pattern on the light source, the light reflection pattern covering the light source and not overlapping with the light reflector,
wherein each of the plurality of light source units comprises a light diffusion pattern on the light source protection layer; and
the light diffusion pattern overlaps with at least a part of the light source and the light reflector and has an outer edge flush with an outer edge of the light reflector.

15. The backlight unit of claim 14, wherein a part of the light source protection layer is disposed between the light reflection pattern and the light diffusion pattern.

16. A backlight unit for a display device, comprising:
a substrate comprising a base layer, an electrode layer on at least a part of the base layer, and a reflection layer on at least a part of the electrode layer; and
a plurality of light source units on the substrate, each of the light source units comprising a light source, a light reflector surrounding the light source and a light source protection layer on the light source and the light reflector;
a light reflection pattern over the light source of each of light source units,
wherein at least a part of the light reflector is positioned higher than the reflection layer and has an inclined surface angled with respect to a top surface of the reflection layer,
wherein the light reflection pattern is contained within the light source unit between a top surface of the light source and a top surface of the light source protection layer, and does not overlap with the light reflector.

17. The backlight unit of claim 16, wherein the light reflector is disposed between the reflection layer and the light source.

18. The backlight unit of claim 16, further comprising a reflector on at least a part of the reflection layer and including a plurality of holes positioned in an area corresponding to each of the plurality of light source units,
wherein an inside surface of each of the plurality of holes is spaced apart from an outside surface of the light reflector of each of the light source units, and
wherein the inclined surface of the light reflector of each of the light source units is angled with respect to a top surface of the reflector.

* * * * *